Feb. 10, 1925.
E. W. SPRENKLE
1,525,964
MACHINE FOR TRIMMING RUBBER SHOES
Filed March 10, 1922    3 Sheets-Sheet 3
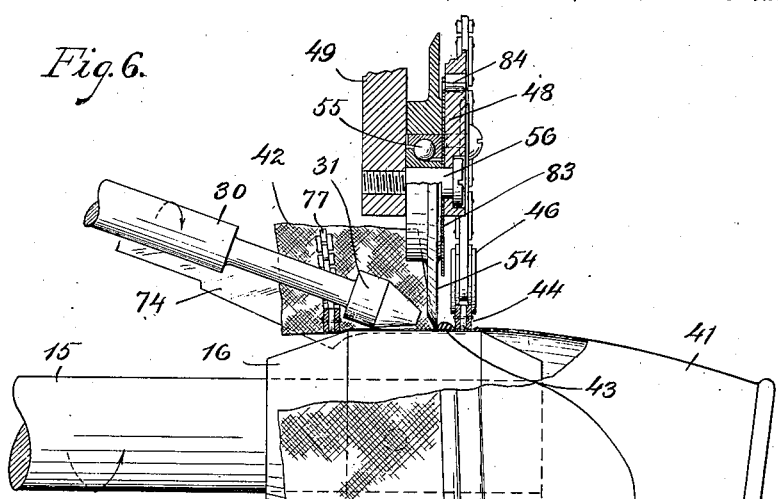
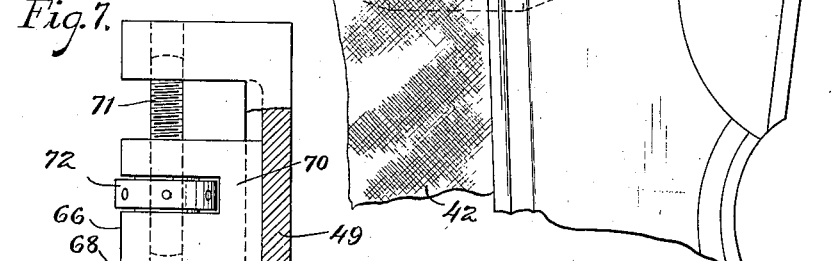
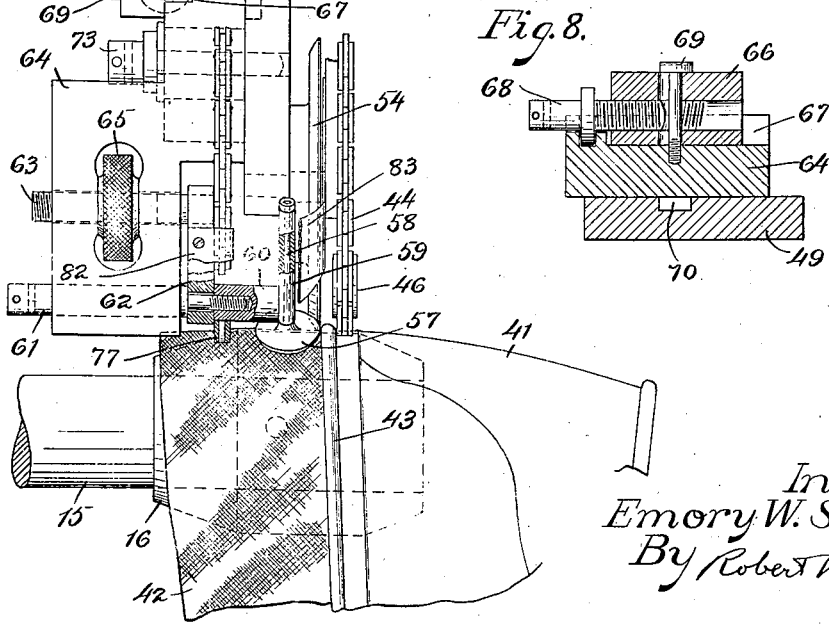
Inventor
Emory W. Sprenkle.
By Robert M. Pierson
Atty.

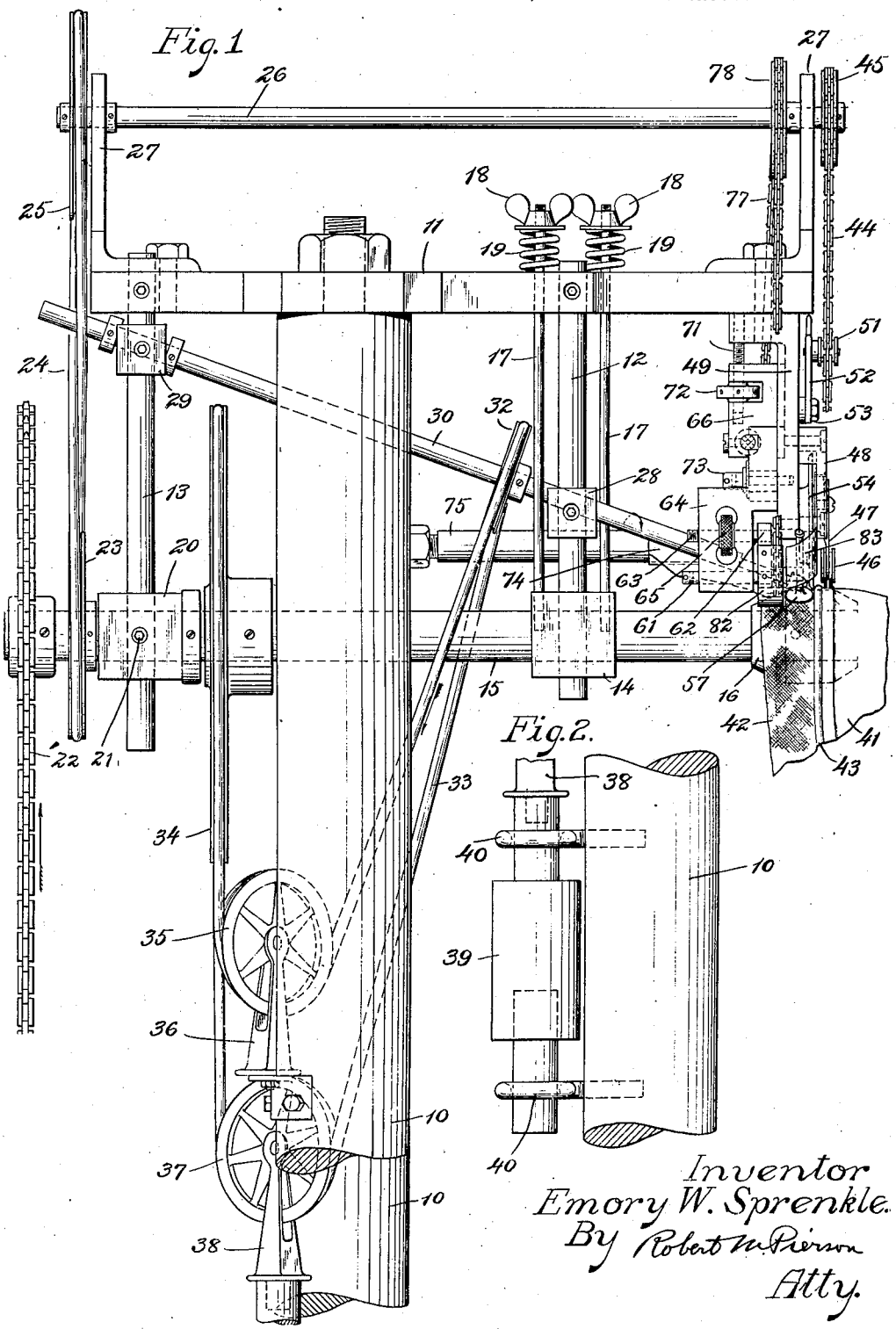

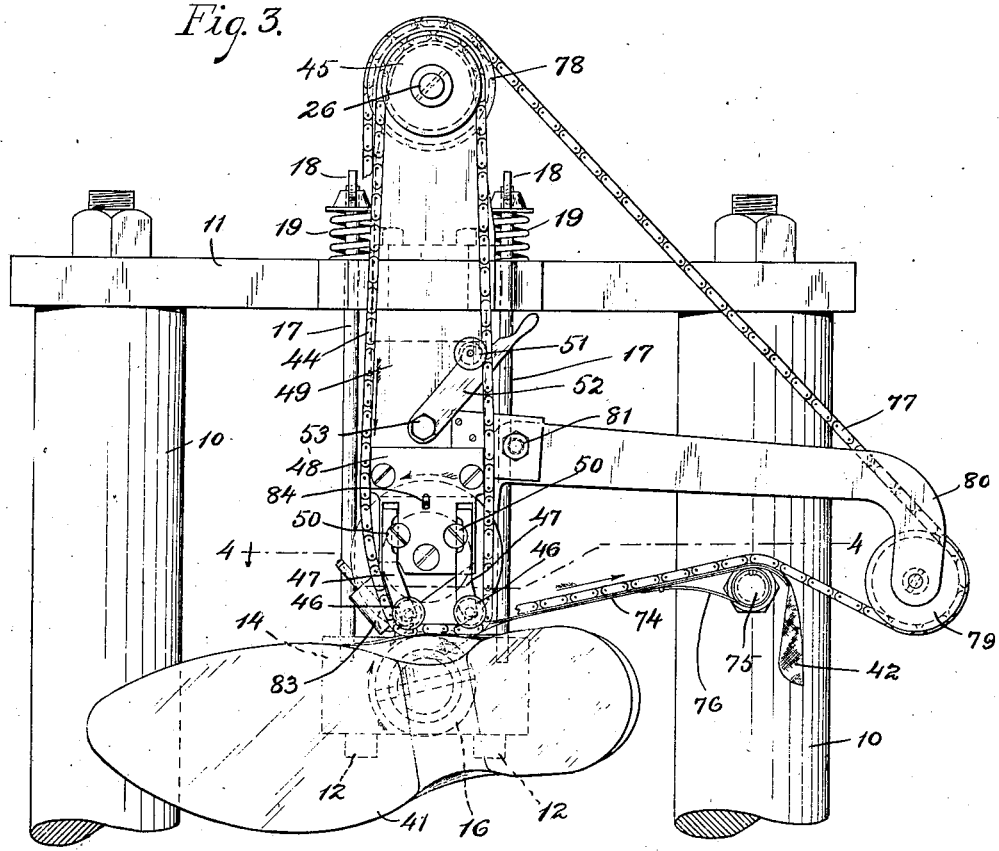

Patented Feb. 10, 1925.

1,525,964

UNITED STATES PATENT OFFICE.

EMORY W. SPRENKLE, OF AKRON, OHIO, ASSIGNOR TO THE B. F. GOODRICH COMPANY, OF NEW YORK, N. Y., A CORPORATION OF NEW YORK.

MACHINE FOR TRIMMING RUBBER SHOES.

Application filed March 10, 1922. Serial No. 542,624.

*To all whom it may concern:*

Be it known that I, EMORY W. SPRENKLE, a citizen of the United States, residing at Akron, in the county of Summit and State of Ohio, have invented a certain new and useful Machine for Trimming Rubber Shoes, of which the following is a specification.

This invention relates to a machine for trimming the excess lining or material projecting from the mouth or opening of a flexible walled article, such as a rubber shoe. This operation, in common practice, has heretofore been performed by hand-shears, and although the operators frequently attain great skill, the element of fatigue and non-uniformity of work has an effect upon the output. The object of my invention is to provide a means whereby an equal or greater output can be secured and the output steadily and uniformly maintained, with less fatigue of operators, through the action of a novel, automatic mechanism taking the place of the hand-shears.

Of the accompanying drawings, Fig. 1 is a side elevation of the principal working portions of a shoe-trimming machine embodying my invention.

Fig. 2 is a detail view showing a pulley-weight and its guiding means.

Fig. 3 is a front elevation.

Fig. 4 is a horizontal section approximately on the line 4—4 of Fig. 3.

Fig. 5 is a detail view showing a part of the shoe-feeder chain and one of its guides.

Fig. 6 is a side elevation, partly broken away and in section, showing the action of the instrumentalities upon the work.

Fig. 7 is a view somewhat similar to Fig. 6 showing additional parts in elevation and section.

Fig. 8 is a section on the line 8—8 of Fig. 7.

In the drawings, 10, 10 are two frame pillars or standards mounted upon a suitable platform which it is unnecessary to show, said platform preferably being supported on wheels so that the machine can be moved about in a shoe factory to the place where the work is located, and provided with electric current in a suitable manner for driving a motor on the platform to furnish the power for the machine. Connecting the pillars 10 across their upper ends is a plate 11, which supports the various working parts. In Fig. 1 is shown one member each of two pairs of rods 12, 13; and in Fig. 3 the lower ends of the front pair 12 are shown in broken lines. On the rods 12 is guided the forward bearing block 14 of a horizontal shaft 15, which carries the main work-feed roller or anvil roller 16 at its front end and said roller is yieldingly elevated by a pair of rods 17 whose lower ends are fastened in the bearing block 14 and their upper ends provided with wing nuts 18 pressed upwardly by springs 19 seated on the plate 11. These springs furnish the pressure for causing the trimmer wheel 54 to cut through the fabric lining on the anvil roller, and their pressure may be adjusted by the wing nuts for different weights of fabric. The rear bearing of the shaft 15 is in a block 20 secured by set-screws 21 at the desired height on the rods 13.

The shaft 15 is driven by a sprocket and chain 22 at its rear end and it carries a pulley 23 which connects by a crossed belt 24 with a pulley 25 at the rear end of an overhead shaft 26, this latter being supported in bearing brackets 27 projecting upwardly from the plate 11.

The rods 12, 13 carry the front and rear pillar-bearing-blocks 28, 29 for an inclined shaft 30, which carries at its front end a lining feed roller 31, said shaft having a pulley 32 driven by a belt 33 from a pulley 34 on the shaft 15. Between the pulleys 32 and 34, said belt passes around a guide pulley 35 mounted in a bearing bracket 36, which is fixed to one of the columns 10, and also around a floating guide-pulley 37, to whose bearing bracket 38 is attached a weight 39 having suitable stems mounted for vertical movement in a pair of guides 40 fixed to one of the pillars. This weight exerts a downward pressure on the shaft 30, which holds the roller 31 yieldingly against the shoe-lining supported by the said rollers 16.

41 represents an ordinary low, rubber overshoe which, in accordance with common practice, is built upon a last with an excess of fabric lining 42 projecting from the top margin or edge of the shoe surrounding the opening or mouth thereof and it is necessary to trim off this excess lining after removal of the last. 43 is the bead or thickened portion customarily formed immediately at or closely adjacent to the top edge of the shoe.

The feeder or anvil roller 16 projects horizontally forward to enter the shoe opening and it is peripherally formed with a middle cylindrical zone and two conical or tapered end zones, as clearly indicated in the drawings. The lining-strip feed roller 31 coacts with the cylindrical portion of said roller 16, near the inner end of such portion and over the outer end of said portion are mounted the outside shoe-feed member and the lining trimmer.

Said outside shoe-feed member preferably takes the form of an endless band or belt, in this case an articulated band or chain 44, the upper end of whose loop passes around a driving wheel 45 fixed to the forward end of the overhead shaft 26 and having a groove formed with toothed sides. The lower end of the chain loop passes around a pair of guide rollers 46 between which is located the acting portion of the chain, which takes a slightly arcuate form, as seen in Fig. 3, to conform to a short arc on the surface of the feed roller 16. These idle rollers are journaled on holder plates 47, which are vertically adjustable in suitable guides on a fixed front plate 48 at the lower end of a supporting bracket 49, which depends from the frame plate 11, the rollers being fixed at the desired height by means of clamping screws 50 engaging their holder plates. 51 is a slack adjusting roller for the chain 44, mounted on an arm 52 which is bolted at 53 to the bracket 49.

54 is the lining trimmer or cutter in the form of a circular disk-knife or wheel mounted to turn freely on a ball bearing 55 surrounding a central stud 56 which passes through the face-plate 48 and screws into the bracket 49, said trimmer wheel being freely confined between the plate and bracket. The trimmer wheel is provided with a thin, blunt cutting edge spaced rearwardly from the chain 44 by a distance equal to the width of the shoe bead 43 and is adapted to be rotated by contact with the work or with the anvil roller 16.

In advance of and as close as possible to the cutting point I mount an edge-guiding rotary abutment or wheel 57 in a plane substantially tangent to the surface of the feed roller 16 for limiting the inward positioning movement of the shoe and coacting with the trimmer wheel in locating the line of cut at the edge of the shoe. The shaft 58 of this guide wheel turns loosely in a bearing 59 formed on a horizontal post 60 which is secured by clamping stud 61 in the desired angular position on a holder plate 62. This holder plate is mounted on a stem 63 which is splined to slide in a fore and aft direction in a bearing in a slide block 64, for the purpose of fixing the axial position of the guide wheel 57 over the feed roller 16, and thus determining the position of the edge of the shoe on said feed roller, this adjustment being accomplished by means of a nut 65 engaging a threaded portion on the stem 63. A horizontal adjustment of the guide wheel in a plane transverse to the axis of the shaft 15 is accomplished with a cross feed of the slide-block 64 on another slide-block 66, with which the block 64 has a horizontal tongue-and-groove guide connection at 67, a cross-feed connection including a screw 68 and a clamping connection including a screw 69. The two slides 64 and 66 are mounted on the rear side of the supporting bracket 49 and the upper end of the cross-feed slide 64 works between said bracket and the lower end of the slide 66. Slide 66 is vertically adjustable on the bracket and has a tongue-and-groove guide connection 70 therewith. 71 is an adjusting screw connecting the vertical slide and bracket and provided with a hand-wheel 72. By means of this latter adjustment the vertical position of the guide wheel 57 with reference to the feed-roller 16 may be fixed, and when both slides have been located in their desired position they are fixed by means of a clamping stud 73 passing through a large hole in the cross-feed slide 64 and screwed into the bracket 49.

74 is a table or tray for receiving the severed portion of the lining strip 42 and leading it away from the shoe, this table being formed of sheet metal and having ears at its posterior end pivoted upon a fixed stud 75 which projects horizontally forward from one of the frame pillars 10. A coiled spring 76 surrounds this stud and has one end anchored in a slot therein while its other end is formed as an arm attached to the under side of the table 74, as seen in Figs. 3 and 4. This spring exerts a downward tension on the table 74 which keeps the anterior end of said table in contact with the feed roller 16.

77 is a take-off belt or band in the form of a chain whose lower active portion overlies and rests upon the table 74 for the purpose of carrying away the severed lining strip from the shoe, this active portion diverging slightly from the line of feed as viewed horizontally in Fig. 4, in order to divert the severed strip from the edge of the shoe. The chain 77 is driven from the overhead shaft 26 by a grooved pulley 78 thereon similar to the pulley 45 but having a slightly larger diameter so that the chain 77 will travel slightly faster than the lining and thus exert a frictional wiping action thereon, which assists in the proper removal of the severed strip and in the smoothing of the lining for the action of the trimming wheel. Adjacent to the cutting point, the chain 77 is guided by passing around the supporting stud 60 for the guide-wheel 57, as seen in Figs. 4 and 7, and at the posterior end of its acting stretch it passes around an idle guide pulley 79 carried by an arm 80 which is pivoted at 81 to the frame bracket 49, said arm and bracket acting by gravity to hold the chain taut with a light tension over the strip-receiving table 74.

The operator's hands are protected from contact with the on-running part of the chain 77 and with parts in that general vicinity by two sheet-metal guards 82, 83, of which the former is attached to the holder plate 62 for supporting the bearing of the guide-wheel 57 and covers the salient part of chain 77 near the trimming point, while the guard 83 is curved around the guide-wheel bearing 59 toward the guard 82 and is suspended on the trimmer wheel stud 56 between said wheel and the face plate 48, and held from turning by a pin 84 on the guard occupying a slot in the face plate.

In the operation of this machine, an overshoe 41 with its projecting lining 42 is inserted between the feed roller 16 and the working instrumentalities which overlie said feed roller, this being accomplished by running the shoe slantingly into working position (as represented, for instance, by the oblique curved line at the forward end of the severed lining strip in Fig. 4) until the bead 43 on the edge of the shoe is brought between the feed chain 44 and the face of the trimming wheel 54. The shoe is rapidly fed circuitously of its top margin by the action on said margin of the inside feed roller 16 and the outside feed chain 44, aided by the feeding action on the projecting lining 42 of the overspeeded chain 77 and the overspeeded lining feed roller 31, the effect of the excess speed of the last two members being incidentally to keep the edge of the shoe against the guide-wheel 57. The proper guiding of the shoe may be more or less assisted by the hand of the operator and as the feeding action takes place the excess lining is rapidly severed at the bead 43 by the action of the trimmer wheel 54 in conjunction with the underlying anvil feed roller 16. The severed lining strip passes over the table 74 and is carried away by the action of the chain 77 and the roller 31. When the circuit of the shoe opening has been made and the excess lining trimmed off, the trimmed shoe is readily removed by running it out on a slant from under the chain 44, whereupon a fresh shoe may be substituted and the operation repeated.

My invention is subject to modification within its scope, and I do not wholly limit my claims to the specific construction shown.

I claim:

1. In a rubber-shoe trimming machine, the combination of rotary, work-engaging means for circuitously feeding by its top margin a shoe having excess lining projecting from its mouth, and a rotary trimming device associated with the feeding means for progressively severing the excess lining from said margin.

2. In a rubber-shoe trimming machine, the combination of inside and outside feeding members adapted to engage the top margin of the shoe between them, said shoe having excess lining projecting from its mouth, and said inside feeding member being rotary and formed with a substantially cylindrical work engaging portion on a substantially horizontal axis, and a trimmer positioned to sever the excess lining from the margin so engaged.

3. In a rubber-shoe trimming machine, the combination of inside and outside feeding members adapted to engage the top margin of the shoe between them, said shoe having excess lining projecting from its mouth, and said inside feeding member comprising a roller journaled on a substantially horizontal axis and formed with a substantially cylindrical work-engaging surface, and a knife coacting with the inside feeding member for trimming the excess lining from said margin.

4. In a rubber-shoe trimming machine, the combination of an anvil feed roller on a horizontal axis adapted to project within the mouth of a shoe having excess lining projecting therefrom, means for rotating said roller, a coacting outside feeding member for engaging the shoe margin, and a work-driven trimming knife coacting with said feed roller for severing the excess lining from said margin.

5. In a rubber-shoe trimming machine, the combination of a feed roller mounted on a substantially horizontal axis to project within the mouth of a shoe having excess lining projecting therefrom, for supporting and propelling the shoe by its top margin, said feed roller having a hard, smooth surface adapted to serve as a backing against which a knife may cut the stock, a coacting outside feed member positioned over said roller, and an excess-lining trimmer coacting with said roller, said trimmer comprising a rotary knife running upon the surface of said roller.

6. In a rubber-shoe trimming machine, the combination of a feed roller adapted to project within the mouth of a shoe having excess lining projecting therefrom, an outside feed member arranged to hold the shoe margin against said roller over an arc of the latter's circumference, and a work-rotated trimmer wheel coacting with the feed roller on said arc for severing the excess lining from said margin.

7. In a rubber-shoe trimming machine, the combination of an inside feed roller, an endless, outside feed band conforming to the contour of said roller over an arc of the latter's circumference, and coacting therewith to feed the shoe by its top margin, said shoe having excess lining projecting from its mouth, and means adjacent the acting portions of said feed roller and band for severing the excess lining from said margin.

8. In a rubber-shoe trimming machine, the combination of a feed roller projecting forwardly on a substantially horizontal axis to enter the mouth of a shoe having excess lining projecting from its mouth, a coacting outside feeder positioned over said roller, and a work-rotated disk trimmer positioned over said roller at a distance back of the outside feeder sufficient to admit the edge-bead of the shoe.

9. In a rubber-shoe trimming machine, the combination of means for feeding by its top margin a shoe having excess lining projecting from its mouth, means for trimming the excess lining from said margin, and means for laterally diverting the severed lining strip away from the shoe, the last said means comprising an element additional to the work-feeding and trimming means and adapted to engage the lining only of the shoe.

10. In a rubber-shoe trimming machine, the combination of means for circuitously feeding by its top margin a shoe having excess lining projecting from its mouth, means for trimming the excess lining from said margin, a table adjacent the line of feed for receiving the severed lining strip, and means for frictionally engaging said strip on said table and diverting it laterally from the shoe.

11. In a rubber-shoe trimming machine, the combination of means for circuitously feeding by its top margin a shoe having excess lining projecting from its mouth, means for trimming the excess lining from said margin, a frictional strip feeder arranged to divert the severed lining strip from the edge of the shoe, and means for imparting to said strip feeder a speed greater than that of the strip.

12. In a rubber-shoe trimming machine, the combination of means for circuitously feeding by its top margin a shoe having excess lining projecting from its mouth, means for trimming the excess lining from said margin, a table for receiving the severed lining strip, and an endless band having a strip-feeding portion overlying said table and frictionally engaging the said strip on said table.

13. In a rubber-shoe trimming machine, the combination of means for circuitously feeding by its top margin a shoe having excess lining projecting from its mouth, means for trimming the excess lining from said margin, a lining feed-roller, and means for rotating said roller at a peripheral speed greater than the speed of said margin.

14. In a rubber-shoe trimming machine, the combination of an inside feed roller, an outside feeder coacting therewith to propel by its margin a shoe having excess lining projecting from its mouth, means for trimming the excess lining from said margin, and an over-speeded lining feed roller coacting with said inside feed roller.

15. In a rubber-shoe trimming machine, the combination of means for circuitously feeding by its top margin a shoe having excess lining projecting from its mouth, means for trimming the excess lining from said margin, an endless band for diverting the severed strip from the shoe, and means for driving said band at a speed exceeding that of said margin.

16. In a rubber-shoe trimming machine, the combination of means for circuitously feeding by its top margin a shoe having excess lining projecting from its mouth, means for trimming the excess lining from said margin, a table for receiving the severed lining strip, and an endless strip-feeding belt having an active portion overlying said table and diverging laterally from the line of feed of the shoe edge.

17. In a rubber-shoe trimming machine, the combination of means for circuitously feeding by its top margin a shoe having excess lining projecting from its mouth, means for trimming the excess lining from said margin, and a guide roller journaled on an axis substantially normal to the adjacent portion of the lining so as to run upon the edge face of the shoe.

18. In a rubber-shoe trimming machine, the combination of means for circuitously feeding by its top margin a shoe having excess lining projecting from its mouth, means for trimming the excess lining from said margin, and an idly-mounted guide-wheel located anterior to the trimming means and so journaled as to run upon the edge face of the shoe.

19. In a rubber-shoe trimming machine, the combination of an inside feed roller for propelling by its top margin a shoe having excess lining projecting from its mouth, a lining trimmer coacting with said roller, and an idly-mounted edge-guiding wheel located immediately anterior to said trimmer and positioned in a plane substantially tangent to the feed roller.

20. In a rubber-shoe trimming machine, the combination of means for circuitously feeding by its top margin a shoe having excess lining projecting from its mouth, means for trimming the excess lining from said margin, an edge-guiding wheel located anterior to the trimming means, and an over-speeded lining feeder adapted to maintain the shoe edge in contact with said wheel.

In witness whereof I have hereunto set my hand this 8th day of March, 1922.

EMORY W. SPRENKLE.